United States Patent
Zhao et al.

(10) Patent No.: US 9,696,591 B2
(45) Date of Patent: Jul. 4, 2017

(54) LIQUID CRYSTAL PANEL AND MANUFACTURING METHOD THEREOF, AND DISPLAY APPARATUS

(71) Applicant: BOE TECHNOLOGY GROUP CO., LTD., Beijing (CN)

(72) Inventors: Chengtan Zhao, Beijing (CN); Jaegeon You, Beijing (CN); Jikai Yao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 14/551,648

(22) Filed: Nov. 24, 2014

(65) Prior Publication Data

US 2015/0362767 A1     Dec. 17, 2015

(30) Foreign Application Priority Data

Jun. 12, 2014   (CN) .......................... 2014 1 0261988

(51) Int. Cl.
   *G02F 1/1339*     (2006.01)

(52) U.S. Cl.
   CPC .. *G02F 1/1339* (2013.01); *G02F 2001/13398* (2013.01)

(58) Field of Classification Search
   CPC .......................... G02F 1/1339; G02F 1/133305
   See application file for complete search history.

(56) References Cited

U.S. PATENT DOCUMENTS

| | | | | |
|---|---|---|---|---|
| 6,118,889 | A * | 9/2000 | Izuno | G06K 9/00154 178/18.03 |
| 2003/0090615 | A1 | 5/2003 | Park | |
| 2003/0099027 | A1* | 5/2003 | Shigehiro | G02F 1/167 359/296 |
| 2005/0185129 | A1* | 8/2005 | Kim | G02F 1/13394 349/156 |
| 2006/0055863 | A1* | 3/2006 | Sawasaki | G02F 1/13394 349/156 |

(Continued)

FOREIGN PATENT DOCUMENTS

| | | |
|---|---|---|
| CN | 101297233 A | 10/2008 |
| CN | 101427292 A | 5/2009 |
| CN | 103792736 A | 5/2014 |

OTHER PUBLICATIONS

Notification of the First Office Action dated Apr. 28, 2016 corresponding to Chinese application No. 201410261988.7.

*Primary Examiner* — Donald Raleigh
(74) *Attorney, Agent, or Firm* — Nath, Goldberg & Meyer; Joshua B. Goldberg; Christopher Thomas

(57) ABSTRACT

The present invention provides a liquid crystal panel and a manufacturing method thereof, and a display apparatus comprising the liquid crystal panel, which relates to the field of display technology, and can avoid the problem that the sealant is separated from the first substrate and/or the second substrate while the liquid crystal panel is bent. The liquid crystal panel of the present invention comprises a first substrate and a second substrate, the first substrate and the second substrate are aligned with each other to form a liquid crystal cell, and the liquid crystal cell is sealed with sealant, wherein, at least one convex structure is provided in a region which corresponds to position of the sealant on the first substrate and/or the second substrate.

7 Claims, 2 Drawing Sheets

(56) References Cited

U.S. PATENT DOCUMENTS

| | | | |
|---|---|---|---|
| 2006/0229376 A1* | 10/2006 | Hayashi | G02B 5/223 522/6 |
| 2009/0147208 A1* | 6/2009 | Tatemori | G02F 1/13394 349/156 |
| 2009/0231516 A1 | 9/2009 | Okada et al. | |
| 2012/0099057 A1* | 4/2012 | Kim | G02F 1/13452 349/106 |
| 2014/0092357 A1* | 4/2014 | Chen | G02F 1/1333 349/155 |
| 2015/0076722 A1* | 3/2015 | Chiang | G02F 1/341 264/1.37 |

* cited by examiner

LIQUID CRYSTAL PANEL AND MANUFACTURING METHOD THEREOF, AND DISPLAY APPARATUS

FIELD OF THE INVENTION

The present invention relates to the field of display technology, and particularly, to a liquid crystal panel and a manufacturing method thereof, and a display apparatus.

BACKGROUND OF THE INVENTION

Currently, a liquid crystal display (LCD) has become a mainstream display product in market due to advantages of good performance and mature technology thereof.

A liquid crystal panel is a key member of a liquid crystal display. As shown in FIGS. 1 and 2, a liquid crystal panel comprising a plurality of pixel units 7 is formed by aligning a first substrate 1 with a second substrate 2 to form a cell, liquid crystal 3 is filled between the first substrate 1 and the second substrate 2 to form a liquid crystal cell 4. In the prior art, a process for aligning the first substrate 1 with the second substrate 2 to form a cell comprises: dripping liquid crystal 3 on one of the first substrate 1 and the second substrate 2 by a liquid crystal dripping device, applying sealant 5 on the other one of the first substrate 1 and the second substrate 2, aligning the first substrate 1 with the second substrate 2 to form a cell, and curing the sealant 5, so that a liquid crystal panel is formed.

The inventor founds that, at least following technical problems are existing in the prior art: since the cured sealant 5 is too hard, when the liquid crystal panel (in particular, a flexible liquid crystal panel) is bent, a pair of stresses with equal magnitudes and opposite directions are produced at contact surfaces between the sealant 5 and the first substrate 1 and between the sealant 5 and the second substrate 2, at this time, a large stress is also produced within the sealant 5, thus the sealant 5 is easily separated from the first substrate 1 and/or the second substrate 2, thereby the liquid crystal panel will not be sealed well, resulting that the liquid crystal 3 will be contaminated, and display effect will be affected.

SUMMARY OF THE INVENTION

In view of the problem of the liquid crystal panel in the prior art, the present invention provides a liquid crystal panel and a manufacturing method thereof, and a display apparatus comprising the liquid crystal panel, which can avoid the problem that the sealant is separated from the first substrate and/or the second substrate while the liquid crystal panel is bent.

A technical solution of the present invention is a liquid crystal panel comprising a first substrate and a second substrate, the first substrate and the second substrate being aligned with each other to form a liquid crystal cell, and the liquid crystal cell being sealed with sealant, wherein, at least one convex structure is provided in a region which corresponds to position of the sealant on the first substrate and/or the second substrate.

Since at least one convex structure is provided in the region which corresponds to the position of the sealant on the first substrate and/or the second substrate, when the liquid crystal panel is bent so that a large stress is produced in the sealant, the convex structure can absorb a part of the stress in the sealant so that stresses produced at contact surfaces between the sealant and the first substrate and between the sealant and the second substrate are relieved (for example, when the liquid crystal panel is bent downward, an outward stress away from the liquid crystal will be produced at the contact surface between the sealant and the second substrate, and an inward stress towards the liquid crystal will be produced at the contact surface between the sealant and the first substrate; when the liquid crystal panel is bent upward, an inward stress towards the liquid crystal will be produced at the contact surface between the sealant and the second substrate, and an outward stress away from the liquid crystal will be produced at the contact surface between the sealant and the first substrate), thereby effectively avoiding a poor display caused by that the liquid crystal is contaminated because the sealant is separated from the first substrate and/or the second substrate while the liquid crystal panel is bent.

Preferably, the convex structure is an elastic convex structure.

As the elastic convex structure has good elasticity, stresses produced at contact surfaces between the sealant and the first substrate and between the sealant and the second substrate may be further relieved.

Preferably, a plurality of convex structures are provided in the region which corresponds to the position of the sealant on the first substrate and/or the second substrate, wherein, the convex structures are arranged with intervals therebetween.

Further preferably, both of the first substrate and the second substrate are provided with at least one convex structure.

Preferably, the convex structure has a height smaller than thickness of the sealant.

Preferably, the convex structure has a height smaller than the thickness of the sealant, and in a direction of the height of the convex structure, the convex structure on the first substrate is partially overlapped with the convex structure on the second substrate.

Preferably, the convex structure is any one of a columnar structure, an annular columnar structure, a cuboid structure and a wedge structure.

Preferably, the convex structure is made of polymer including styrene butadiene or nitrile butadiene.

Preferably, the sealant is made of epoxy resin.

Preferably, the liquid crystal panel is a flexible liquid crystal panel.

Another technical solution of the present invention is a manufacturing method of a liquid crystal panel, the liquid crystal panel comprises a first substrate and a second substrate, the first substrate and the second substrate being aligned with each other to form a liquid crystal cell, and the liquid crystal cell being sealed with sealant, the manufacturing method comprises: forming a pattern including at least one convex structure in a region which corresponds to position of the sealant on the first substrate and/or the second substrate by a patterning process.

Preferably, the convex structure is an elastic convex structure.

Preferably, a pattern including a plurality of convex structures is formed in the region which corresponds to the position of the sealant on the first substrate and/or the second substrate by the patterning process, wherein, the convex structures are arranged with intervals therebetween.

Further preferably, the step of forming the pattern including a plurality of convex structures in the region which corresponds to the position of the sealant on the first substrate and/or the second substrate by the patterning process specifically comprises: forming the pattern including a plurality of convex structures in the region which corresponds to the position of the sealant on the first substrate and the second substrate by the patterning process.

Still another technical solution of the present invention is a display apparatus comprising the liquid crystal panel described above.

Even if the liquid crystal panel and the display apparatus of the present invention are bent, the sealant is still not separated from the first substrate and/or the second substrate, thus display effect will not be affected.

Reference signs: 1, first substrate; 2, second substrate; 3, liquid crystal; 4, liquid crystal cell; 5, sealant; 6, convex structure; 7, pixel unit.

DETAILED DESCRIPTION OF EMBODIMENTS

Hereinafter, the present invention will be described in detail in conjunction with accompanying drawings and specific embodiments so that persons skilled in the art can understand technical solutions of the present invention better.

First Embodiment

Figure 1:
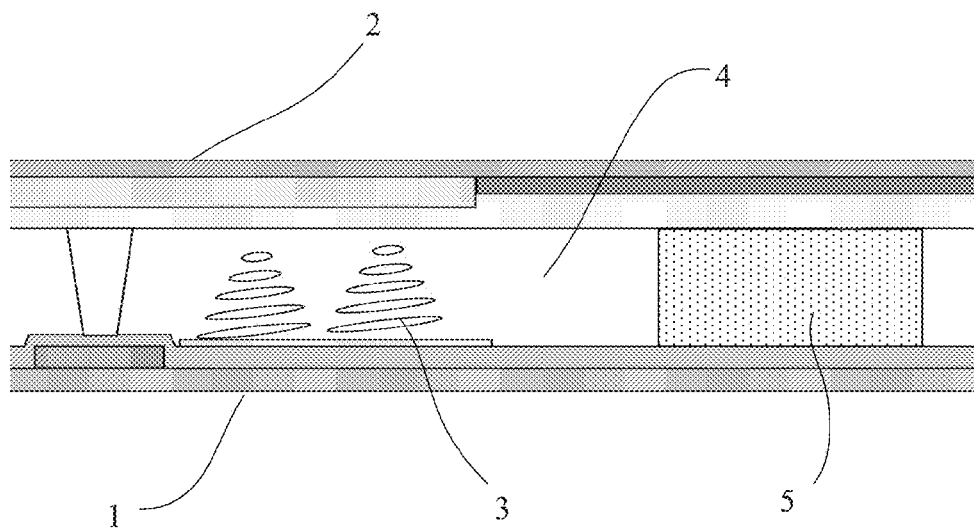
FIG. 1 shows a cross-sectional diagram of a liquid crystal panel in the prior art.
Figure 2:
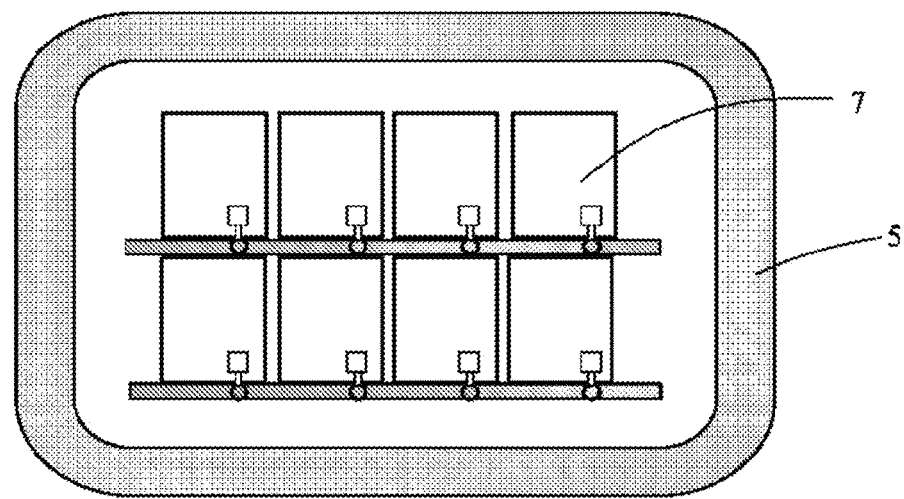
FIG. 2 shows a top view diagram of the liquid crystal panel in the prior art.
Figure 3:
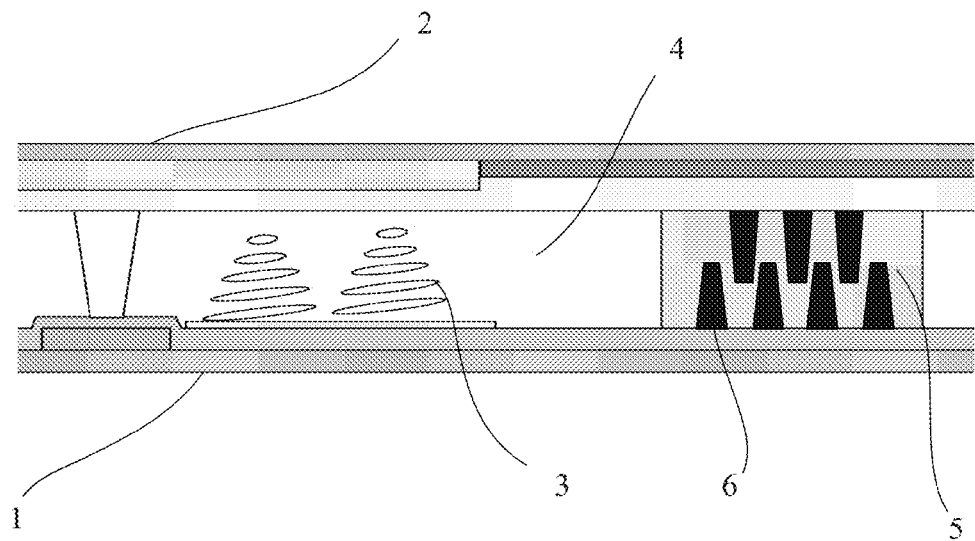
FIG. 3 shows a cross-sectional diagram of a liquid crystal panel in accordance with a first embodiment of the present invention.
Figure 4:
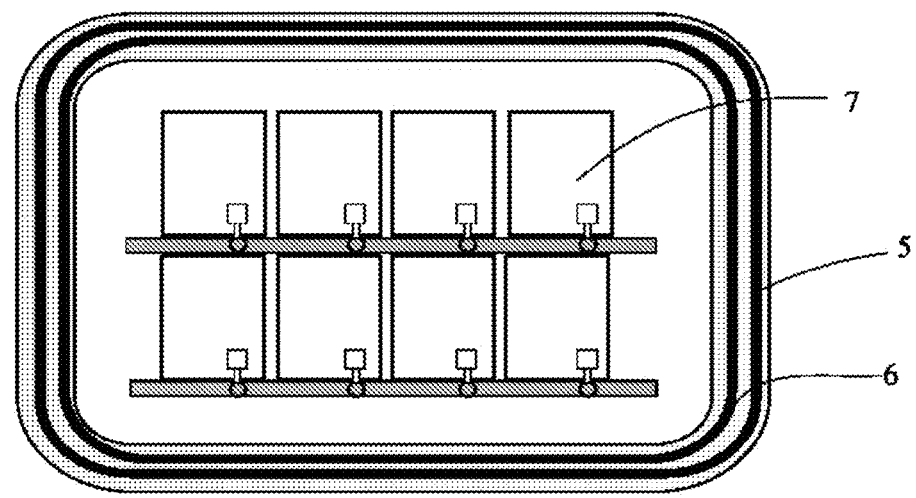
FIG. 4 shows a top view diagram of the liquid crystal panel in accordance with the first embodiment of the present invention.

Referring to FIGS. 3 and 4, the present embodiment provides a liquid crystal panel comprising a first substrate 1 and a second substrate 2, the first substrate 1 and the second substrate 2 are aligned with each other to form a liquid crystal cell 4, liquid crystal 3 is filled in the liquid crystal cell 4, and the liquid crystal cell 4 is sealed with sealant 5, wherein a plurality of convex structures 6 are provided in a region which corresponds to position of the sealant 5 on the first substrate 1 and the second substrate 2, and the convex structures 6 are arranged with intervals therebetween.

It should be noted that, the first substrate may be a color filter substrate or an array substrate. Correspondingly, the second substrate may be an array substrate or a color filter substrate. When the first substrate is a color filter substrate, the second substrate is an array substrate. In contrast, when the first substrate is an array substrate, the second substrate is a color filter substrate.

Since a plurality of convex structures 6 are provided in the region which corresponds to the position of the sealant 5 on the first substrate 1 and the second substrate 2 of the liquid crystal panel of the present embodiment, when the liquid crystal panel is bent so that a large stress is produced in the sealant 5, the convex structures 6 can absorb a part of the stress in the sealant 5 so that stresses produced at contact surfaces between the sealant 5 and the first substrate 1 and between the sealant 5 and the second substrate 2 are relieved (for example, when the liquid crystal panel is bent downward, an outward stress away from the liquid crystal 3 will be produced at the contact surface between the sealant 5 and the second substrate 2, and an inward stress towards the liquid crystal 3 will be produced at the contact surface between the sealant 5 and the first substrate 1; when the liquid crystal panel is bent upward, an inward stress towards the liquid crystal 3 will be produced at the contact surface between the sealant 5 and the second substrate 2, and an outward stress away from the liquid crystal 3 will be produced at the contact surface between the sealant 5 and the first substrate 1), thereby effectively avoiding a poor display caused by that the liquid crystal 3 is contaminated because the sealant 5 is separated from the first substrate 1 and/or the second substrate 2 while the liquid crystal panel is bent.

Preferably, the convex structures 6 are elastic convex structures. As the elastic convex structures have good elasticity, stresses produced at the contact surfaces between the sealant and the first substrate and between the sealant and the second substrate may be further relieved.

Moreover, in order to relieve the problem as much as possible that the sealant 5 is separated from the first substrate 1 and/or the second substrate 2 while the liquid crystal panel is bent, preferably, both of the first substrate 1 and the second substrate 2 are provided with a plurality of convex structures 6, wherein the convex structures 6 on the first substrate 1 and the convex structures 6 on the second substrate 2 are arranged with intervals therebetween, so that adhesion between the sealant 5 and the first and second substrates 1, 2 is further enhanced.

Preferably, each of the convex structures 6 has a height smaller than thickness of the sealant 5. That is, the convex structures 6 provided on the first substrate 1 do not contact with the second substrate 2, and the convex structures 6 provided on the second substrate 2 do not contact with the first substrate 1. In this way, the stress in the sealant 5 can be relieved well by the convex structures 6, meanwhile, sealing effect of the sealant 5 on the liquid crystal cell 4 is almost not affected. Of course, the convex structures 6 provided on the first substrate 1 may contact with the second substrate 2, and the convex structures 6 provided on the second substrate 2 may contact with the first substrate 1, as long as sealing effect of the sealant 5 on the liquid crystal cell 4 is not affected.

Preferably, each of the convex structures 6 has a height smaller than the thickness of the sealant 5, and in a direction of the height of the convex structure 6, the convex structures 6 on the first substrate 1 are partially overlapped with the convex structures 6 on the second substrate 2. In this way, the adhesion between the sealant 5 and the first and second substrates 1, 2 can be further enhanced.

In the present embodiment, the convex structures 6 may be columnar structures, annular columnar structures, cuboid structures or wedge structures. Of course, the convex structures 6 may be convex structures in other shapes, as long as the stress in the sealant 5 can be relieved. Preferably, as shown in FIG. 4, the convex structures 6 are annular columnar structures formed along trace of the sealant. The convex structures 6 may have cross sections in any appropriate shapes. For example, as shown in FIG. 3, the convex structures 6 may have trapezoidal cross sections.

Preferably, the convex structures 6 are made of polymer including styrene butadiene or nitrile butadiene, for example, made of copolymer of butadiene and acrylonitrile, copolymer of butadiene and styrene, or any materials with a good adhesion with polyimide (PI), silicon nitride (SiNx) or resin material. Preferably, the convex structures 6 are made of material with good elasticity. The sealant 5 is preferably made of the epoxy resin, or may be made of mixture of the epoxy resin and various substances such as the photo-curing filler glue. It should be noted that, material of the convex structures 6 and material of the sealant 5 do not affect with each other. For example, in a case of the material of the convex structures 6 being material with good elasticity, when the sealant 5 is cured, the convex structures 6 still have good elasticity.

The liquid crystal panel of the present embodiment may be a flexible liquid crystal panel.

Although both of the first substrate 1 and the second substrate 2 are provided with a plurality of convex structures in the present embodiment, it should be understood that, one of the first substrate 1 and the second substrate 2 may be provided with one convex structure and the other of the first substrate 1 and the second substrate 2 is provided one or more convex structures, or, one or more convex structures may be provided on either of the first substrate 1 and the second substrate 2.

Second Embodiment

The present embodiment provides a manufacturing method of a liquid crystal panel. The liquid crystal panel comprises a first substrate and a second substrate, the first substrate and the second substrate are aligned with each other to form a liquid crystal cell, and the liquid crystal cell is sealed with sealant. The manufacturing method comprises: forming a pattern including at least one convex structure in a region which corresponds to position of the sealant on the first substrate and/or the second substrate by a patterning process.

Since at least one convex structure is provided in the region which corresponds to the position of the sealant on the first substrate and/or the second substrate, when the liquid crystal panel manufactured by the manufacturing method of the present embodiment is bent so that a large stress is produced in the sealant, the convex structure can absorb a part of the stress in the sealant so that stresses produced at contact surfaces between the sealant and the first substrate and between the sealant and the second substrate are relieved (for example, when the liquid crystal panel is bent downward, an outward stress away from the liquid crystal will be produced at the contact surface between the sealant and the second substrate, and an inward stress towards the liquid crystal will be produced at the contact surface between the sealant and the first substrate; when the liquid crystal panel is bent upward, an inward stress towards the liquid crystal will be produced at the contact surface between the sealant and the second substrate, and an outward stress away from the liquid crystal will be produced at the contact surface between the sealant and the first substrate), thereby effectively avoiding a poor display caused by that the liquid crystal is contaminated because the sealant is separated from the first substrate and/or the second substrate while the liquid crystal panel is bent.

Preferably, the convex structure is an elastic convex structure. As the elastic convex structure has good elasticity, stresses produced at the contact surfaces between the sealant and the first substrate and between the sealant and the second substrate may be further relieved.

Preferably, a pattern including a plurality of convex structures is formed in the region which corresponds to the position of the sealant on the first substrate and/or the second substrate by the patterning process, wherein, the convex structures are arranged with intervals therebetween.

Further preferably, the step of forming the pattern including a plurality of convex structures in the region which corresponds to the position of the sealant on the first substrate and/or the second substrate by the patterning process specifically comprises: forming the pattern including a plurality of convex structures in the region which corresponds to the position of the sealant on the first substrate and the second substrate by the patterning process.

With the manufacturing method of the present embodiment, both of the first substrate and the second substrate are provided with the convex structures, and the convex structures are arranged with intervals therebetween, thus the problem that the sealant is separated from the first substrate and/or the second substrate while the liquid crystal panel is bent can be avoided or relieved as much as possible.

It should be noted that, manufacturing methods of the first substrate and the second substrate in the present embodiment are the same as that in the prior art, which will not be described here.

Third Embodiment

The present embodiment provides a display apparatus comprising the liquid crystal panel of the first embodiment.

The display apparatus may be a mobile phone, a tablet computer, a television, a display, a notebook computer, a digital photo frame, a navigator or any other product or member with a display function.

Since the display apparatus of the present embodiment comprises the liquid crystal panel of the first embodiment, even if the display apparatus is bent, the sealant is still not separated from the first substrate and/or the second substrate, thus display effect will not be affected.

Of course, the display apparatus of the present embodiment may further comprise other conventional structures such as a power supply unit, a display drive unit and the like.

It should be understood that, the above embodiments are only used to explain the principle of the present invention, but not to limit the present invention. A person skilled in the art can make various variations and modifications without departing from spirit and scope of the present invention, and the variations and the modifications are also considered to be within the protection scope of the present invention.

The invention claimed is:

1. A liquid crystal panel which comprises a first substrate and a second substrate, the first substrate and the second substrate being aligned with each other to form a liquid crystal cell, and the liquid crystal cell being sealed with sealant, wherein, both of the first substrate and the second substrate are provided with a plurality of convex structures in a region which corresponds to a position of the sealant on the first substrate and the second substrate, wherein the convex structures on the first substrate and the convex structures on the second substrate are arranged with intervals therebetween;

wherein, the convex structure is an elastic convex structure;

wherein, the convex structure on the first substrate is partially overlapped with the convex structure on the second substrate;

wherein an end of the convex structure on the first substrate proximal to the second substrate is overlapped with an end of the convex structure on the second substrate proximal to the first substrate in a direction perpendicular to the first substrate and the second substrate; and wherein the convex structure has a height smaller than a thickness of the sealant in the direction perpendicular to the first substrate and the second substrate, so that the convex structure on the first substrate is not in contact with the second substrate, and the convex structure on the second substrate is not in contact with the first substrate.

2. The liquid crystal panel of claim 1, wherein, the convex structure is a columnar structure, an annular columnar structure, a cuboid structure or a wedge structure.

3. The liquid crystal panel of claim 1, wherein, the convex structure is made of polymer including styrene butadiene or nitrile butadiene.

4. The liquid crystal panel of claim 1, wherein, the sealant is made of epoxy resin.

5. The liquid crystal panel of claim 1, wherein, the liquid crystal panel is a flexible liquid crystal panel.

6. A display apparatus, characterized in comprising the liquid crystal panel of claim 1.

7. A manufacturing method of a liquid crystal panel, the liquid crystal panel comprises a first substrate and a second substrate, the first substrate and the second substrate being aligned with each other to form a liquid crystal cell, and the liquid crystal cell being sealed with sealant, wherein, the manufacturing method comprises:

forming a pattern on both the first substrate and the second substrate by a patterning process, the pattern including a plurality of convex structures in a region which corresponds to a position of the sealant on the first substrate and the second substrate, wherein the convex structures on the first substrate and the convex structures on the second substrate are arranged with intervals therebetween;

wherein, the convex structure is an elastic convex structure;

wherein, the convex structure on the first substrate is partially overlapped with the convex structure on the second substrate;

wherein an end of the convex structure on the first substrate proximal to the second substrate is overlapped with an end of the convex structure on the second substrate proximal to the first substrate in a direction perpendicular to the first substrate and the second substrate; and wherein the convex structure has a height smaller than a thickness of the sealant in the direction perpendicular to the first substrate and the second substrate, so that the convex structure on the first substrate is not in contact with the second substrate, and the convex structure on the second substrate is not in contact with the first substrate.

* * * * *